(12) United States Patent
Fukuhara

(10) Patent No.: US 12,728,385 B2
(45) Date of Patent: Sep. 8, 2026

(54) DRAIN DISCHARGE STRUCTURE IN COMPRESSED PNEUMATIC CIRCUIT

(71) Applicant: FUKUHARA Co., Ltd., Kanagawa (JP)

(72) Inventor: Hiroshi Fukuhara, Kanagawa (JP)

(73) Assignee: FUKUHARA CO., LTD., Kanagawa (JP)

( * ) Notice: Subject to any disclaimer, the term of this patent is extended or adjusted under 35 U.S.C. 154(b) by 421 days.

(21) Appl. No.: 18/276,379

(22) PCT Filed: Oct. 21, 2022

(86) PCT No.: PCT/JP2022/039335
§ 371 (c)(1),
(2) Date: Aug. 8, 2023

(87) PCT Pub. No.: WO2024/009525
PCT Pub. Date: Jan. 11, 2024

(65) Prior Publication Data
US 2025/0018328 A1 Jan. 16, 2025

(30) Foreign Application Priority Data
Jul. 4, 2022 (JP) ................................ 2022-107551

(51) Int. Cl.
*B01D 53/14* (2006.01)
*B01D 46/00* (2022.01)
*B01D 53/04* (2006.01)

(52) U.S. Cl.
CPC ..... *B01D 53/1475* (2013.01); *B01D 46/0004* (2013.01); *B01D 46/0031* (2013.01);
(Continued)

(58) Field of Classification Search
CPC .......... B01D 46/0031; B01D 2252/204; B01D 2257/504; C02F 1/28
(Continued)

(56) References Cited

U.S. PATENT DOCUMENTS

2022/0134307 A1* 5/2022 Sadiq ....................... C09D 7/60 95/108
2025/0214029 A1* 7/2025 Marumoto ............ B01J 20/165

FOREIGN PATENT DOCUMENTS

JP H11132145 A * 5/1999 ............. F04B 39/16
JP 4418872 B2 * 2/2010
(Continued)

OTHER PUBLICATIONS

Civmats, The difference among coupling, union and nipple [online], Jul. 2018 [retrieved Oct. 16, 2025]. Retrieved from the Internet <URL: https://www.civmats.com/news/news29/news29.HTML> (Year: 2018).*

(Continued)

*Primary Examiner* — Jennifer Dieterle
*Assistant Examiner* — Rachel Marie Slaugovsky
(74) *Attorney, Agent, or Firm* — Paratus Law Group, PLLC

(57) ABSTRACT

A drain discharge structure in a compressed pneumatic circuit includes: a drain trap provided on one or more devices disposed in the compressed pneumatic circuit; an oil separator including an oil adsorption material configured to separate and remove oil contained in drain and compressed exhaust discharged from the drain trap; and a CO2 separator provided in a stage subsequent to the oil separator and including a CO2 separation material configured to separate and remove CO2. The CO2 separator includes a hollow tubular main body, a bottom body, and a lid body.

8 Claims, 1 Drawing Sheet

(52) U.S. Cl.
CPC .... *B01D 53/0407* (2013.01); *B01D 2252/204* (2013.01); *B01D 2253/108* (2013.01)

(58) Field of Classification Search
USPC ........................................................... 55/17
See application file for complete search history.

(56) References Cited

FOREIGN PATENT DOCUMENTS

| | | |
|---|---|---|
| JP | 6686591 B2 | 4/2020 |
| JP | 6887099 B2 | 6/2021 |

OTHER PUBLICATIONS

Dec. 13, 2022, International Search Report issued for related PCT Application No. PCT/JP2022/039335.
Dec. 13, 2022, International Search Opinion issued for related PCT Application No. PCT/JP2022/039335.

* cited by examiner

DRAIN DISCHARGE STRUCTURE IN COMPRESSED PNEUMATIC CIRCUIT

CROSS REFERENCE TO PRIOR APPLICATION

This application is a National Stage Patent Application of PCT International Patent Application No. PCT/JP2022/039335 (filed on Oct. 21, 2022) under 35 U.S.C. § 371, which claims priority to Japanese Patent Application No. 2022-107551 (filed on Jul. 4, 2022), which are all hereby incorporated by reference in their entirety.

TECHNICAL FIELD

The present invention relates to a technique for separating and adsorbing CO2 contained in drain, and specifically, relates to a technique for discharging drain generated in a compressed pneumatic circuit in a state in which CO2 is separated and removed.

BACKGROUND ART

In a compressed pneumatic circuit, a large amount of water vapor is contained in compressed air compressed by a compressor, and the water vapor becomes drain by being cooled by a device disposed in the compressed pneumatic circuit or colliding with an inner wall, and is discharged together with the compressed air from a discharge port provided on the device through a drain trap. A pressure inside the device in which the drain is stored is also increased due to the compressed air, and thus a large amount of gas such as CO2 is dissolved in the drain in a manner of being proportional to the pressure in accordance with Henry's law. Therefore, when the drain is discharged to the outside from the device, the pressure applied to the drain decreases at the same time as the discharge, and thus there is a problem that CO2 dissolved in the drain is also released into the atmosphere as the pressure decreases.

Accordingly, there is a demand for a technique for reducing CO2 released to the atmosphere by separating and removing CO2 contained in drain and compressed air (hereinafter, referred to as compressed exhaust) discharged together with the drain.

In order to solve the above problem, techniques described in Japanese Patent No. 6686591 (Patent Literature 1) and Japanese Patent No. 6887099 (Patent Literature 2) have been proposed. That is, Patent Literature 1 describes a technique of measuring a ph value in drain discharged from a boiler device and neutralizing carbon dioxide or lowering an oxygen concentration based on a measured value. Patent Literature 2 describes a technique of absorbing CO2 by causing CO2-containing gas to flow into a container provided with a nozzle for mixing a CO2 absorbent and gas and spraying the mixture.

However, the technique proposed in Patent Literature 1 is a technique for determining a neutralization amount of carbon dioxide by the ph value of the drain, and is not a technique intended to completely remove carbon dioxide contained in the drain, and thus does not solve the above problem. Further, also in the technique proposed in Patent Literature 2, it is difficult to spray the CO2 absorbent to the entire CO2-containing gas only by spraying from the nozzle, CO2 that is not brought into contact with the absorbent is released as it is, and since only gas is to be absorbed, CO2 in the drain, which is a liquid, is assumed to be unexpected, and the above problem is not solved.

The present applicant focuses on a problem that CO2 is likely to be dissolved in drain generated in a compressed pneumatic circuit, and the dissolved CO2 is dissipated into the atmosphere with a decrease in pressure at the time of drain discharge, and the present applicant develops a drain discharge structure capable of separating and removing CO2 contained in drain and compressed exhaust discharged from a device by providing a CO2 separator at a stage subsequent to a drain trap provided on the device in the compressed pneumatic circuit based on an idea that CO2 can be separated and removed from drain and compressed exhaust, and reaches the proposal of the "drain discharge structure in compressed pneumatic circuit" according to the present invention.

CITATION LIST

Patent Literature

Patent Literature 1: JP6686591B
Patent Literature 2: JP6887099B

SUMMARY OF INVENTION

Technical Problem

In view of the above problems, an object of the present invention is to provide a drain discharge structure capable of reliably separating and removing CO2 contained in drain and compressed exhaust discharged from a device in a compressed pneumatic circuit.

Solution to Problem

In order to solve the above problems, the present invention provides a drain discharge structure in a compressed pneumatic circuit including: a drain trap provided on one or more devices disposed in the compressed pneumatic circuit; an oil separator including an oil adsorption material configured to separate and remove oil contained in drain and compressed exhaust discharged from the drain trap; and a CO2 separator provided in a stage subsequent to the oil separator and including a CO2 separation material configured to separate and remove CO2, in which the CO2 separator includes a hollow tubular main body formed from a tubular body that includes a hollow portion and opens upward and downward respectively, the hollow portion being filled with the CO2 separation material, a bottom body including an inflow port at a predetermined position and configured to close a lower opening end of the hollow tubular main body via a fastener, and a lid body including a discharge port at a predetermined position and configured to close an upper opening end of the hollow tubular main body via a fastener.

According to the present invention, the oil separator includes a housing formed from a tubular body that includes a hollow portion and opens upward and downward respectively, the hollow portion being filled with the oil adsorption material, a bottom body including an inflow port at a predetermined position and configured to close a lower opening end of the housing via a fastener, and a lid body including a discharge port at a predetermined position and configured to close an upper opening end of the housing via a fastener.

Further, according to the present invention, the oil separator is provided at a lower end portion of the hollow tubular main body of the CO2 separator.

Further, according to the present invention, in the hollow portion of the hollow tubular main body in the CO2 separator, an amine CO2 absorption material formed of an amine substance and a zeolite adsorption material formed of zeolite are filled in a state of being alternately laminated.

Further, according to the present invention, the CO2 separator is connected via a union joint.

According to the present invention, the drain trap is connected with a drain branch pipe configured to discharge drain, a tip of the drain branch pipe is connected to a drain main pipe, and drain discharged from the drain trap joins the drain main pipe through the drain branch pipe and is discharged.

Advantageous Effects of Invention

According to the drain discharge structure in a compressed pneumatic circuit in the present invention, the drain discharge structure includes the drain trap provided on the compressed pneumatic circuit, the oil separator including the oil adsorption material, and the CO2 separator, and thus an excellent effect is achieved that it is possible to discharge clean drain and compressed exhaust obtained by removing oil and CO2 from drain discharged from the compressed pneumatic circuit and compressed exhaust discharged together with the drain in consideration of a global environment.

According to the drain discharge structure in a compressed pneumatic circuit in the present invention, the oil separator is a tubular body and the hollow portion is filled with the oil adsorption material, whereby it is possible to separate and remove oil contained in drain and compressed exhaust discharged from the compressed pneumatic circuit in advance by the oil separator, and then to send drain and compressed exhaust from which oil is separated and removed to the CO2 separator provided at a stage subsequent to the oil separator, and thus an excellent effect is achieved that oil can be prevented from entering the CO2 separator.

Further, according to the drain discharge structure in a compressed pneumatic circuit in the present invention, the oil separator is provided at the lower end portion of the hollow tubular main body of the CO2 separator, whereby drain and compressed exhaust containing oil are prevented from directly flowing into the CO2 separator, and oil can be removed without disposing a new device as the oil separator, and thus an excellent effect of contributing to space saving of the entire compressed pneumatic circuit is achieved.

Further, according to the drain discharge structure in a compressed pneumatic circuit in the present invention, in the hollow portion of the hollow tubular main body in the CO2 separator, the amine CO2 absorption material formed of an amine substance and the zeolite adsorption material formed of zeolite are filled in a state of being alternately laminated, whereby CO2, which cannot be separated in a first layer provided in the hollow portion of the CO2 separator, can be separated in a next layer or a layer next to the next layer, and thus an excellent effect of contributing to generation of clean drain and compressed exhaust from which CO2 is separated is achieved.

Further, according to the drain discharge structure in a compressed pneumatic circuit in the present invention, the CO2 separator is connected via the union joint, and thus an excellent effect is achieved that the CO2 separator can be smoothly removed and replaced.

According to the drain discharge structure in a compressed pneumatic circuit in the present invention, the drain branch pipe for drain discharge and the drain main pipe are connected to the drain trap, and drain discharged from the drain trap joins the drain main pipe through the drain branch pipe and is discharged, and thus an excellent effect is achieved that drain and compressed exhaust discharged from the drain trap provided on the device in the compressed pneumatic circuit can be caused to join the drain main pipe through the drain branch pipe, and the joined drain and compressed exhaust can be discharged to the outside through the oil separator and the CO2 separator.

DESCRIPTION OF EMBODIMENTS

A most significant characteristic of a drain discharge structure in a compressed pneumatic circuit according to the present invention is that CO2 contained in drain and compressed exhaust discharged from a drain trap is separated and removed by a CO2 separator. Hereinafter, embodiments of the drain discharge structure in a compressed pneumatic circuit according to the present invention will be described with reference to the drawings.

The drain discharge structure in a compressed pneumatic circuit according to the present invention is not limited to the embodiments described below, and can be appropriately changed within a scope of a technical idea of the present invention, that is, within a scope of a shape, a dimension, a material, and the like which makes it possible to achieve the same operation and effect.

First, a drain discharge structure 1 in a compressed pneumatic circuit according to the present invention will be described with reference to FIGS. 1 and 2.

Figure 1:
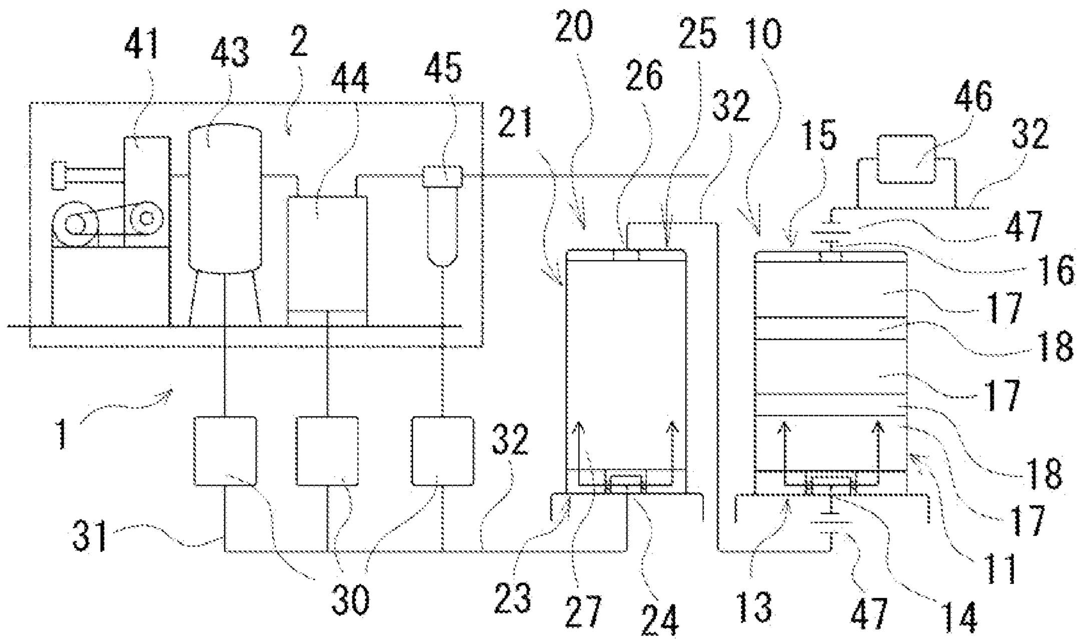
FIG. 1 is a schematic diagram illustrating an embodiment of a drain discharge structure in a compressed pneumatic circuit according to the present invention.

FIG. 1 is a schematic diagram illustrating an embodiment of the drain discharge structure 1 in a compressed pneumatic circuit according to the present invention. FIG. 2 is a schematic diagram illustrating another embodiment of the drain discharge structure 1 in a compressed pneumatic circuit according to the present invention. A CO2 separator 10 is a device for separating and removing CO2 from drain and compressed exhaust discharged from a compressed pneumatic circuit 2 through a drain trap 30, and mainly includes a hollow tubular main body 11, a bottom body 13, and a lid body 15.

The hollow tubular main body 11 includes a hollow portion filled with a CO2 separation material, is closed by the bottom body 13 and the lid body 15, and separates and removes CO2 from drain and compressed exhaust flowed from an inflow port 14.

The hollow tubular main body 11 is implemented by a tubular body that includes the hollow portion and opens upward and downward respectively. An outer shape of the hollow tubular main body 11 is not particularly limited as long as the hollow tubular main body 11 has a tubular shape, and a cylindrical shape or a polygonal tubular shape may be considered. The bottom body 13 and the lid body 15 are attached to a lower opening end and an upper opening end of the hollow tubular main body 11, respectively. The hollow portion of the hollow tubular main body 11 is filled with the CO2 separation material, and when drain and compressed exhaust flowing from the inflow port 14 provided on the bottom body 13 pass through the inside of the hollow portion, CO2 is separated and removed, and drain and compressed exhaust from which CO2 is separated and removed are discharged to the outside from a discharge port 16 provided on the lid body 15.

The CO2 separation material filled in the hollow portion of the hollow tubular main body 11 is not particularly limited as long as the CO2 separation material is a material for absorbing and adsorbing CO2 when drain and compressed exhaust passing through, and as illustrated in FIG. 1, it is a preferable aspect in which an amine CO2 absorption material 17 using amines and a zeolite adsorption material 18 using zeolite are filled in a manner of being alternately laminated. By adopting this aspect, CO2 is absorbed by a chemical absorption method when drain and compressed exhaust entering from the inflow port 14 provided on the bottom body 13 rise inside the hollow tubular main body 11, and pass through the amine CO2 absorption material 17. CO2 that is not absorbed by the layer of the amine CO2 absorption material 17 is adsorbed to zeolite by passing through the zeolite adsorption material 18 filled in a next layer. Further, by laminating layers one after the other, CO2 in drain and compressed exhaust is separated, which contributes to reduction of CO2 contained in drain and compressed exhaust discharged from the discharge port 16 provided on the lid body 15.

Examples of an amine compound used as the amine CO2 absorption material 17 include, but are not particularly limited to, aliphatic primary, secondary and tertiary amines, a polyamine, a polyimine, a cyclic amine, an amidine compound, a hindered amine, an aminosiloxane compound, an amino acid. Zeolite used as the zeolite adsorption material 18 is a mineral having a porous body that selectively adsorbs CO2. A shape of the zeolite adsorption material 18 is not particularly limited, and for example, the zeolite adsorption material 18 may have a shape such as a round-grain, a pellet form, or a crushed shape, whereby a contactable surface area is widened, and CO2 is effectively adsorbed.

Drain and compressed exhaust flowing from the inflow port 14 and rising toward the discharge port 16 pass through the amine CO2 absorption material 17 filled in a lower portion of the hollow portion, and CO2 is absorbed. Thereafter, drain and compressed exhaust pass while coming into contact with a surface of the zeolite adsorption material 18 filled in an upper stage of the amine CO2 absorption material 17, whereby CO2 remaining in compressed air is adsorbed. The same operation is repeated for the number of layers of the CO2 separation material filled in the hollow portion, and drain and compressed exhaust flowed into the CO2 separator 10 become clean drain and compressed exhaust from which CO2 is removed, and are discharged to the outside from the discharge port 16.

The bottom body 13 closes a lower side of the hollow tubular main body 11, and includes the inflow port 14 through which drain and compressed exhaust can flow into the hollow tubular main body 11.

The bottom body 13 has a size that allows the bottom body 13 to close the lower opening end of the hollow tubular main body 11, and has a configuration in which the inflow port 14 is provided at a predetermined position (preferably at a substantially central position in a plan view). A fastener of the bottom body 13 to the lower opening end of the hollow tubular main body 11 is not particularly limited, and the bottom body 13 is attached to the lower opening end, for example, by a fastener such as screwing. A method for forming a flow path through which drain and compressed exhaust flowing from the bottom body 13 enter the hollow tubular main body 11 is not particularly limited, and for example, as illustrated in FIG. 1, a plurality of flow paths can be formed by providing a flow path forming portion in a manner of dispersing drain and compressed exhaust flowed from the inflow port 14 provided at the substantially central position of a bottom portion of the bottom body 13 in an outer circumferential direction of the hollow tubular main body 11, and a load on the CO2 separation material filled in the hollow portion of the hollow tubular main body 11 can be dispersed.

The lid body 15 closes an upper side of the hollow tubular main body 11, and includes the discharge port 16 capable of sending drain and compressed exhaust from which CO2 is separated and removed by the CO2 separation material filled in the hollow portion to a subsequent stage.

The lid body 15 has a size that allows the lid body 15 to close the upper opening end of the hollow tubular main body 11, and has a configuration in which the discharge port 16 is provided at a predetermined position (preferably at a substantially central position in the plan view). As in the case of the bottom body 13, a fastener of the lid body 15 to the upper opening end of the hollow tubular main body 11 is not particularly limited, and the lid body 15 is attached to the upper opening end, for example, by a fastener such as screwing. Drain and compressed exhaust from which CO2 is separated and removed by the hollow tubular main body 11 are discharged as clean drain and compressed exhaust from the discharge port 16 provided on the lid body 15 to the outside.

An aspect is preferable in which a union joint 47 is provided in the vicinity of a connection point between the inflow port 14 and a drain main pipe 32 and in the vicinity of a connection point between the discharge port 16 and the drain main pipe 32, respectively, whereby the CO2 separator 10 itself can be removed due to a decrease in a CO2 separation function due to an abnormality in a main body of the CO2 separator 10, replacement of the CO2 separation material, or the like. By adopting this aspect, even when an abnormality occurs, it is possible to recover by simply replacing the main body of the CO2 separator 10 with an alternative, and even at the time of recovery of the CO2 separation material which adsorbs and absorbs CO2, the main body of the CO2 separator 10 can be directly transferred as it is to a workplace at which the recovery of CO2 can be performed, and the CO2 separation material can be directly taken out, which contributes to shortening working time.

Further, an aspect is also preferable in which a CO2 concentration meter 46 is provided in the vicinity of the discharge port 16. Regarding a measurement method of the CO2 concentration meter 46, a non-dispersive infrared (NDIR) method is generally used, but the method is not particularly limited. By providing the CO2 concentration meter 46 in the vicinity of the discharge port 16, the amount of CO2 contained in drain and compressed exhaust discharged finally can be measured, and thus it is possible to confirm a total reduction amount of CO2 and to check whether an abnormality occurs in the CO2 separator 10 based on measurement data.

The compressed pneumatic circuit 2 includes an air compressor 41 and a device such as an air tank 43, an air dryer 44, and an air filter 45, and separates and removes drain and foreign object such as dust from a compressed air generated by the air compressor 41, and sends the obtained compressed air to a subsequent utilization device.

An air pipe is connected to a connection portion between the device and the air compressor 41 disposed in the compressed pneumatic circuit 2, and compressed air generated by the air compressor 41 passes through the device disposed in the compressed pneumatic circuit 2 and the air pipe connected to the device, and is sent to the utilization device using compressed air by a pipe connected to a stage subsequent to the compressed pneumatic circuit 2.

The air compressor 41 is provided at a most upstream stage of the compressed pneumatic circuit 2, compresses the atmosphere to generate compressed air with increased pressure, and supplies the compressed air to a subsequent stage.

The compressed air generated by the air compressor 41 contains drain which is moisture such as water vapor present in the atmosphere (hereinafter, simply referred to as drain) and foreign object such as oil mist and dust (hereinafter, simply referred to as foreign object), and thus the compressed air is sent to the utilization device of compressed air after providing the device capable of removing the foreign object in the subsequent stage.

The air compressor 41 includes an oil supply type compressor that uses lubricating oil for lubricating components to prevent seizure, and an oil-free type air compressor 42 that is designed to eliminate a mixing path of oil and to prevent oil from being mixed when generating compressed air, but the air compressor 41 is not particularly designated, and a type of the air compressor is determined depending on the utilization device, a utilization purpose, or the like of compressed air.

The compressed pneumatic circuit 2 includes one or more devices such as the air tank 43, the air dryer 44, and the air filter 45 at a stage subsequent to the air compressor 41, separates and removes foreign object from compressed air generated by the air compressor 41, and sends compressed air from which foreign object is separated and removed to the utilization device at the subsequent stage.

The air pipe is connected to the connection portion between the air compressor 41 and the device and connected between plural ones of the device.

The type, the number, and the order of arrangement of the device disposed in the compressed pneumatic circuit 2 vary depending on the utilization device connected to the stage subsequent to the compressed pneumatic circuit 2, a utilization method thereof, and the like. For example, for a purpose of removing dirt from golf shoes and trousers with a golf air gun, as illustrated in FIG. 1, the air tank 43, the air dryer 44, and the air filter 45 are arranged at the stage subsequent to the air compressor 41, respectively. The air tank 43 is provided for a purpose of leveling a pulsation of a pressure of air discharged from the air compressor 41 and preventing a sudden pressure drop when a large amount of compressed air is temporarily consumed. After moisture in the compressed air is separated and removed and a temperature of the compressed air is lowered by the air dryer 44, compressed air from which moisture is separated and removed is caused to pass through the air filter 45 to remove dust, and then compressed air from which dust is removed is sent to the utilization device connected to the subsequent stage. The air gun which is the utilization device discharges clean and low-temperature compressed air from which foreign object and drain in compressed air are removed.

The device disposed in the compressed pneumatic circuit 2 is provided with the drain trap 30 for discharging drain stored in a lower portion of the device to the outside.

The drain trap 30 is provided at a predetermined position of each of the device disposed in the compressed pneumatic circuit 2, and mechanically discharges drain removed by the device. Each of the drain trap 30 is connected to a drain branch pipe 31 respectively, the drain branch pipe 31 capable of sending drain to be discharged to a subsequent stage.

The drain trap 30 is a mechanism that mechanically discharges, to the outside, drain generated due to a change in temperature when compressed air passes through the air pipe, collision with an inner wall of the device, or the like, and is connected to an oil separator 20 via the drain branch pipe 31 and the drain main pipe 32. The drain trap 30 may be of an electromagnetic type, a float type, or the like depending on a discharge method thereof, but the drain trap 30 is not particularly limited, and a drain trap known in the related art may be used. During a discharge operation executed by the drain trap 30, compressed air staying in the vicinity of drain is also discharged together with the drain, and thus the compressed air becomes compressed exhaust with pressure and flows out to the drain branch pipe 31.

The drain branch pipe 31 is a pipe including a base portion connected to the drain trap 30 and capable of sending drain and compressed exhaust that are mechanically discharged to the subsequent stage. The drain branch pipe 31 connected to the drain trap 30 provided on the device joins the drain main pipe 32 by bringing a tip portion of the drain branch pipe 31 to connect to the drain main pipe 32 which is implemented by one pipe, and flows into the oil separator 20. It is a preferable aspect in which a check valve is provided at a predetermined position of the base portion of the drain branch pipe 31. By adopting this aspect, discharged drain and compressed exhaust are prevented from flowing back to the drain trap 30 and the device of the compressed pneumatic circuit 2.

The drain main pipe 32 is a pipe that causes the drain branch pipe 31 to join into one flow path, and causes drain and compressed exhaust discharged from the drain trap 30 to pass through the oil separator 20 and the CO2 separator 10, and then sends the obtained drain and compressed exhaust to the outside. Although not illustrated, by providing a valve in the vicinity of an inflow port 24 of the oil separator 20 and the inflow port 14 of the CO2 separator 10, respectively, even at the time of replacement of fillers of the oil separator 20 and the CO2 separator 10, or a failure or the like occurs, sending of drain and compressed exhaust can be temporarily stopped by closing the provided valves.

The oil separator 20 is a device for separating and removing oil from drain and compressed exhaust discharged from the drain trap 30 and causing the obtained drain and compressed exhaust to flow out to the CO2 separator 10 in the subsequent stage, and includes a housing 21, a bottom body 23, and a lid body 25.

By separating and removing oil by the oil separator 20, oil is prevented from adhering to the CO2 separation material filled in the CO2 separator 10 connected to a stage subsequent to the oil separator 20, and an excellent effect of contributing to an improvement of CO2 absorption and adsorption performance of the CO2 separation material and long life of the CO2 separation material can be expected.

The housing 21 includes a hollow portion filled with an oil adsorption material 27, is closed by the bottom body 23 and the lid body 25, and separates and removes oil from drain and compressed exhaust flowed in from the inflow port 24.

The housing 21 is implemented by a tubular body including a hollow portion that opens upward and downward. An outer shape of the housing 21 is not particularly limited as long as the housing 21 has a tubular shape, and a cylindrical shape or a polygonal tubular shape may be considered. The bottom body 23 and the lid body 25 are attached to a lower opening end and an upper opening end of the housing 21, respectively. The oil adsorption material 27 is filled in the hollow portion of the housing 21, and when drain and compressed exhaust flowing in from the inflow port 24 provided on the bottom body 23 pass through the inside of the hollow portion, oil is separated and removed, and the obtained drain and compressed exhaust are sent to the CO2 separator 10 provided in the stage subsequent to the oil separator 20 from a discharge port 26 provided on the lid body 25.

The oil adsorption material 27 filled in the hollow portion of the housing 21 is not particularly limited as long as the oil adsorption material 27 is a material that absorbs and adsorbs oil during the passage of drain and compressed exhaust.

For example, activated coal or microporous fiber, cotton fiber, polyethylene fiber, and polypropylene fiber may be considered. A filling method, a shape, and the like are not particularly limited, and an aspect may be considered in which a plurality of materials capable of absorbing and adsorbing oil are made into fine particles and alternately laminated. By adopting this aspect, an excellent effect can be expected that it is possible to sufficiently remove oil in drain and compressed exhaust flowed into the oil separator 20 and then to send the obtained drain and compressed exhaust to the CO2 separator 10 provided in the subsequent stage.

Figure 2:
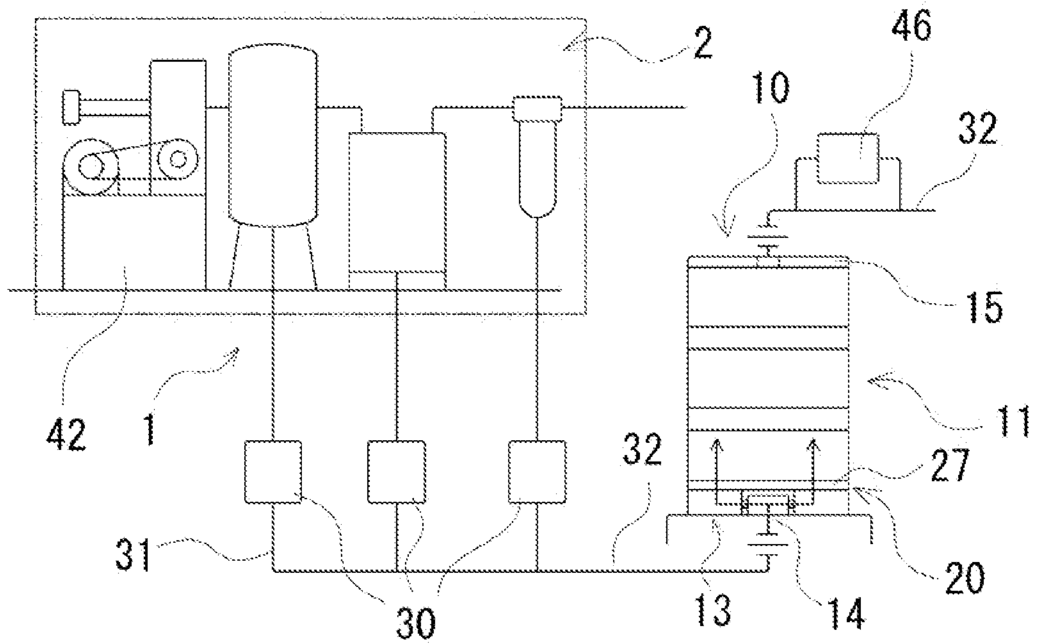
FIG. 2 is a schematic diagram illustrating another embodiment of the drain discharge structure in a compressed pneumatic circuit according to the present invention.

As illustrated in FIG. 2, in a case of the compressed pneumatic circuit 2 using the oil-free type air compressor 42, it is a preferable aspect in which a structure of the oil separator 20 is simplified, and the oil adsorption material 27 is provided on a lowermost surface of the CO2 separation material filled in the hollow tubular main body 11. By adopting this aspect, it is possible to contribute to space saving of an arrangement space, and although drain and compressed exhaust sent out through the drain main pipe 32 flow into the CO2 separator 10, the drain and the compressed exhaust pass through the CO2 separation material after passing through the oil adsorption material 27, and even when oil is mixed in drain and compressed exhaust, oil is first separated and removed by the oil adsorption material 27, and thus it is possible to prevent oil from adhering to the CO2 separation material.

Example 1

Main operations and effects of the drain discharge structure 1 in a compressed pneumatic circuit having the above configuration will be described with reference to FIG. 1.

First, compressed air generated by the air compressor 41 passes through a device such as the air tank 43, the air dryer 44, and the air filter 45, which is disposed at a stage subsequent to the air compressor 41, whereby foreign object is removed, and then the obtained compressed air is sent to a utilization device as clean compressed air. At this time, drain stored in a lower portion of the device such as the air tank 43, the air dryer 44, and the air filter 45 is sent to the drain branch pipe 31 by a mechanical discharge operation executed by the drain trap 30 provided at a predetermined position of the device. At this time, compressed air staying in the vicinity of the drain also flows into the drain branch pipe 31 together with the drain as compressed exhaust by the discharge operation of the drain trap 30. Then, the drain and the compressed exhaust flowing in the drain branch pipe 31 join the drain main pipe 32, and flow into the housing 21 via the bottom body 23 through the inflow port 24 of the oil separator 20.

The drain and the compressed exhaust flowed into the housing 21 rise while coming into contact with the oil adsorption material 27 filled in the housing 21, whereby oil is separated, and after flowing into the lid body 25, the obtained drain and compressed exhaust are sent to the inflow port 14 of the CO2 separator 10 disposed at a stage subsequent to the oil separator 20 via the drain main pipe 32 through the discharge port 26 provided on the lid body 25.

The drain and the compressed exhaust flowed in from the inflow port 14 of the CO2 separator 10 enter the hollow tubular main body 11 from the bottom body 13, flow into the lid body 15 after CO2 is separated and removed by rising while coming into contact with the amine CO2 absorption material 17 and the zeolite adsorption material 18 filled in the hollow tubular main body 11, and then the obtained drain and compressed exhaust are discharged to the outside from the discharge port 16 provided on the lid body 15 through the drain main pipe 32.

Example 2

An example in another embodiment of the present invention will be described with reference to FIG. 2. The same parts as those in Example 1 w % ill be omitted. FIG. 2 is a schematic diagram illustrating the another embodiment of the present invention, in which oil and CO2 are separated and removed from drain and compressed exhaust discharged from the compressed pneumatic circuit 2.

Example 1 describes an example in which drain and compressed exhaust discharged from the drain trap 30 are caused to pass through the CO2 separator 10 after passing through the oil separator 20, whereas further improvement is possible. That is, by replacing the air compressor 41 in compressed pneumatic circuit 2 with the oil-free type air compressor 42 having a structure in which oil is not mixed at the time of generating compressed air, a content of oil in compressed air sent to a utilization device, drain, and compressed exhaust can be reduced. By adopting such an aspect, the amount of oil to be separated and removed from drain and compressed exhaust is small, and thus it is possible to achieve space saving while having a function of the oil separator 20 by providing the function of the oil separator 20 in the CO2 separator 10 itself and disposing the CO2 separator 10 as one device as illustrated in FIG. 2 rather than disposing the oil separator 20 as an independent device as illustrated in FIG. 1.

As illustrated in FIG. 2, in the present example, the oil-free type air compressor 42 is provided merely instead of the air compressor 41, and the oil separator 20 is provided on a lowermost portion of the hollow tubular main body 11 in the CO2 separator 10 instead of being used as an independent device, and oil and CO2 contained in drain and compressed exhaust discharged from the compressed pneumatic circuit 2 are separated and removed.

By providing the oil separator 20 on the lowermost portion of the CO2 separator 10, drain and compressed exhaust flowed in from the inflow port 14 first pass through the oil adsorption material 27 provided as the oil separator 20, and after oil contained in the drain and the compressed exhaust is separated and removed, the obtained drain and compressed exhaust rise in the hollow tubular main body 11 filled with the amine CO2 absorption material 17 and the zeolite adsorption material 18.

A flow of the drain discharge structure 1 in a compressed pneumatic circuit employing the above configuration will be described.

Drain and compressed exhaust discharged from the compression pneumatic circuit 2 flow into the bottom body 13 from the inflow port 14 of the CO2 separator 10 through the drain trap 30, the drain branch pipe 31, and the drain main pipe 32. The drain and the compressed exhaust that enter the hollow tubular main body 11 from the bottom body 13 first pass through the oil adsorption material 27 which is the oil separator 20, whereby oil is separated and removed, and then the obtained drain and compressed exhaust rise through a flow path in which the amine CO2 absorption material 17 and the zeolite adsorption material 18 are laminated, thereby becoming clean drain and compressed exhaust from which CO2 is separated and removed, and then the clean drain and compressed exhaust are discharged to the outside from the discharge port 16 provided on the lid body 15 through the drain main pipe 32.

The basic aspects and the operations and effects of the drain discharge structure in a compressed pneumatic circuit according to the present invention are described above, but the present invention is not limited to the embodiments and the configurations illustrated in the drawings. For example, an aspect may be considered in which a punched metal having a waterproof property and provided with a plurality of vent holes is provided on a lower portion of the hollow tubular main body 11, whereby a flow path through which drain and compressed exhaust flowed in from the inflow port 14 enter the hollow tubular main body 11 is caused to rise in a further dispersed state.

As described above, in the drain discharge structure in a compressed pneumatic circuit according to the present invention, the oil separator and the CO2 separator for separating and removing oil and CO2 contained in drain and compressed exhaust discharged from the compressed pneumatic circuit are provided on the drain main pipe, whereby CO2 contained in a large amount in the drain can be removed before being discharged to the outside, which contributes to reduction of greenhouse gas to be released to the atmosphere.

INDUSTRIAL APPLICABILITY

The drain discharge structure in a compressed pneumatic circuit according to the present invention is an invention contributing to discharge of drain containing no CO2 in all fields in which compressed air is used, and further, it is possible to recover CO2 separated in the CO2 separator and reuse the recovered CO2 as dry ice or industrial gas. Therefore, the "drain discharge structure in compressed pneumatic circuit" according to the present invention is considered to have a high industrial availability.

REFERENCE SIGNS LIST

1: drain discharge structure in compressed pneumatic circuit
2: compressed pneumatic circuit
10: CO2 separator
11: hollow tubular main body
13: bottom body
14: inflow port
15: lid body
16: discharge port
17: amine CO2 absorption material
18: zeolite adsorption material
20: oil separator
21: housing
23: bottom body
24: inflow port
25: lid body
26: discharge port
27: oil adsorption material
30: drain trap
31: drain branch pipe
32: drain main pipe
41: compressor
42: oil-free type air compressor
43: air tank
44: air dryer
45: air filter
46: CO2 concentration meter
47: union joint

The invention claimed is:

1. A drain discharge structure configured to be used in a compressed pneumatic circuit, the drain discharge structure comprising:
- at least one drain trap, each drain trap being provided on one or more devices disposed in the compressed pneumatic circuit;
- an oil separator including an oil adsorption material configured to separate and remove oil contained in drain and compressed exhaust discharged from the compressed pneumatic circuit through the drain trap; and
- a CO2 separator provided in a stage subsequent to the oil separator with respect to a flow of the drain and the compressed exhaust discharged through the drain trap,
- wherein the CO2 separator includes
  - a CO2 separation material configured to separate and remove CO2,
  - a hollow tubular main body formed from a tubular body that includes a hollow portion and opens upward and downward respectively, the hollow portion being filled with the CO2 separation material,
  - a bottom body including an inflow port at a predetermined position and configured to close a lower opening end of the hollow tubular main body, and
  - a lid body including a discharge port at a predetermined position and configured to close an upper opening end of the hollow tubular main body.

2. The drain discharge structure according to claim 1, wherein the oil separator includes
- a housing formed from a tubular body that includes a hollow portion and opens upward and downward respectively, the hollow portion being filled with the oil adsorption material,
- a bottom body including an inflow port at a predetermined position and configured to close a lower opening end of the housing via a fastener, and
- a lid body including a discharge port at a predetermined position and configured to close an upper opening end of the housing via a fastener.

3. The drain discharge structure according to claim 1, wherein the oil separator is provided at a lower end portion of the hollow tubular main body of the CO2 separator.

4. The drain discharge structure according to claim 1, wherein in the hollow portion of the hollow tubular main body in the CO2 separator, as the CO2 separation material, an amine CO2 absorption material formed of an amine substance and a zeolite adsorption material formed of zeolite are filled in a state of being alternately laminated.

5. The drain discharge structure according to claim 1, wherein the CO2 separator is connected to the oil separator via a union joint.

6. The drain discharge structure according to claim 1, wherein the drain trap is connected with a drain branch pipe configured to discharge drain, a tip of the drain branch pipe is connected to a drain main pipe, and drain discharged from the drain trap joins the drain main pipe through the drain branch pipe and is discharged.

7. The drain discharge structure according to claim 1, wherein the inflow port closes the lower opening end of the hollow tubular main body via a fastener.

8. The drain discharge structure according to claim 1, wherein the discharge port closes the upper opening end of the hollow tubular main body via a fastener.

* * * * *